United States Patent
Das et al.

(10) Patent No.: US 6,839,000 B2
(45) Date of Patent: Jan. 4, 2005

(54) INTEGRATED, SINGLE COLLAR MEASUREMENT WHILE DRILLING TOOL

(75) Inventors: Pralay K. Das, Sugar Land, TX (US); Eric Joseph Deutsch, Houston, TX (US); Charles Haynes, San Diego, CA (US)

(73) Assignee: Baker Hughes Incorporated, Houston, TX (US)

(*) Notice: Subject to any disclaimer, the term of this patent is extended or adjusted under 35 U.S.C. 154(b) by 576 days.

(21) Appl. No.: 10/055,485

(22) Filed: Oct. 29, 2001

(65) Prior Publication Data

US 2003/0080743 A1 May 1, 2003

(51) Int. Cl.$^7$ ................................................. G01V 3/00
(52) U.S. Cl. .......................... 340/853.1; 340/853.3; 175/40; 175/50; 166/254.2; 324/351; 324/366
(58) Field of Search .......................... 340/853.3, 853.1; 324/351, 366; 166/254.2; 175/40, 50

(56) References Cited

U.S. PATENT DOCUMENTS

| | | | |
|---|---|---|---|
| 3,209,323 A | 9/1965 | Grossman | 340/18 |
| 3,866,678 A | 2/1975 | Jeter | 166/66 |
| 4,799,546 A | 1/1989 | Hensley et al. | 166/250 |
| 5,278,550 A | 1/1994 | Rhein-Knudsen et al. | 340/855.1 |
| 5,883,516 A | 3/1999 | Steenwyk et al. | 324/366 |
| 6,247,542 B1 * | 6/2001 | Kruspe et al. | 175/40 |
| 6,429,784 B1 * | 8/2002 | Beique et al. | 340/853.2 |
| 6,564,883 B2 * | 5/2003 | Fredericks et al. | 175/50 |

* cited by examiner

Primary Examiner—Albert K. Wong
(74) Attorney, Agent, or Firm—Madan, Mossman & Sriram, P.C.

(57) ABSTRACT

An integrated, single collar measurement while-while-drilling tool is presented that comprises formation sensors, directional sensors, pressure sensors, a mud pulse telemetry device, and a turbine-generator power device configured in a single collar housing that is no longer than a standard drill collar. No electrical connections are made across drill collar tool joints. The tool provides high reliability and ease of transportation.

6 Claims, 3 Drawing Sheets

INTEGRATED, SINGLE COLLAR MEASUREMENT WHILE DRILLING TOOL

BACKGROUND OF THE INVENTION

1. Field of the Invention

The present invention relates generally to drilling systems and more particularly to a system of drilling boreholes having a measurement-while-drilling ("MWD") tool wherein the MWD tool has formation sensors, directional sensors, a power source, and a telemetry device integrated in a single tool no longer than a standard drill collar.

2. Description of the Related Art

Those skilled in the art have long recognized the importance of obtaining various borehole measurements during the course of a drilling operation. Typically, these measurements include such data as the weight imposed on the drill bit, the torque applied to the drill string, the inclination and azimuthal direction of the borehole interval that is then being drilled, borehole pressures and temperatures, drilling mud conditions as well as formation parameters including, but not limited to, resistivity and natural gamma emission of the earth formations being penetrated. Heretofore most of these measurements were obtained either by temporarily positioning special measuring devices in the drill string or by periodically removing the drill string and employing suitable wireline logging tools.

In recent years, however, the drilling technology has advanced sufficiently that these measurements can now be readily obtained by so-called measurement-while-drilling or "MWD" tools that are tandemly coupled in the drill string and operated during the drilling operation. Several MWD tools presently in commercial operation typically include a thick-walled tubular body carrying various sensors and their associated measurement-encoding circuitry which is preferably positioned in the drill string just above the drill bit for measuring the conditions near the bottom of the borehole. These commercial tools generally employ a selectively-operable acoustic signaler which is cooperatively arranged in the tool body for successively transmitting encoded measurement signals through the drilling mud within the drill string to the surface where the signals are detected and recorded by suitable surface instrumentation.

The typical commercial MWD tool is arranged as a multi-sectional tool having various special-purpose cartridges that are respectively housed in separable thick-walled bodies and suitably arranged to be coupled together in various combinations for assembling an MWD tool capable of obtaining one or more selected measurements. The multiple sections require both mechanical and electrical connections, such as the prior art arrangement shown in FIG. 1. It is essential that the electrical connectors in the tool bodies be protected from damage. A common problem is that when any tool is assembled while hanging in the slips on a rotary table, the threads on these thick-walled bodies will be damaged from time to time even though every precaution is used in handling the bodies. If the damage to the threads is not severe, the tool body may be returned to service after the threads are redressed. If the damage is more serious, the tool body must be reconditioned either by cutting off the damaged threads and rethreading the damaged end portion or by replacing the entire threaded end portion. In any event, once the tool body has been reconditioned, its overall length will be changed; and, before that body can be reused, some modification must be made to the connector or to any cartridge that is to be subsequently placed in that body before other tool bodies can be utilized with the reconditioned body. Another problem stems from the making and breaking of electrical connections outside of a protected environment, such as on a rig floor. Moisture or other contaminants typically cause reduced reliability of such connections. It will be appreciated that electrical connections between multiple tool sections, at the rig site, are a major reliability issue with MWD service.

The methods and apparatus of the present invention overcome the foregoing disadvantages of the prior art by providing an integrated MWD system which provides the basic downhole sensors in a single collar section. In addition, all tool electrical connections are made up in a controlled environment.

SUMMARY OF THE INVENTION

The present invention contemplates an integrated measurement while drilling tool that comprises formation sensors, directional sensors, pressure sensors, a telemetry device, and a power device configured in a single collar housing that is no longer than a standard drill collar.

In a preferred embodiment, the integrated, single collar tool comprises a collar housing that is no longer than a standard drill collar that is inserted in a downhole drilling assembly. A plurality of sensors are coupled to the collar housing. The sensors are adapted to measure downhole parameters of interest such as formation resistivity, formation gamma ray emission, bore pressure, annulus pressure, inclination, and azimuth. The sensor measurements are transmitted to a surface processor by a mud pulse telemetry device disposed in the housing. A downhole turbine-generator provides electrical power to the downhole tool.

In another preferred embodiment, the integrated, single collar tool comprises a collar housing that is no longer than a standard drill collar that is inserted in a downhole drilling assembly. A sonde is installed in a bore in the housing. Multiple sensors and a housing located processor are mounted to the housing. Each sensor has its own conditioning electronics located with it. The sensors are adapted to measure formation resistivity, formation gamma ray emission, bore pressure, and annulus pressure and to transmit the sensor measurements to the housing processor. The housing processor transmits the sensor information to a sonde mounted telemetry processor. The sonde has the telemetry processor and a directional package wherein the directional package provides directional information to the telemetry processor. The telemetry processor acts cooperatively with a mud pulse telemetry device to transmit the directional information and the housing mounted sensor information to the surface processor for use by the operator. A downhole turbine-generator is mounted in the sonde to generate electrical power from the flowing drilling fluid.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
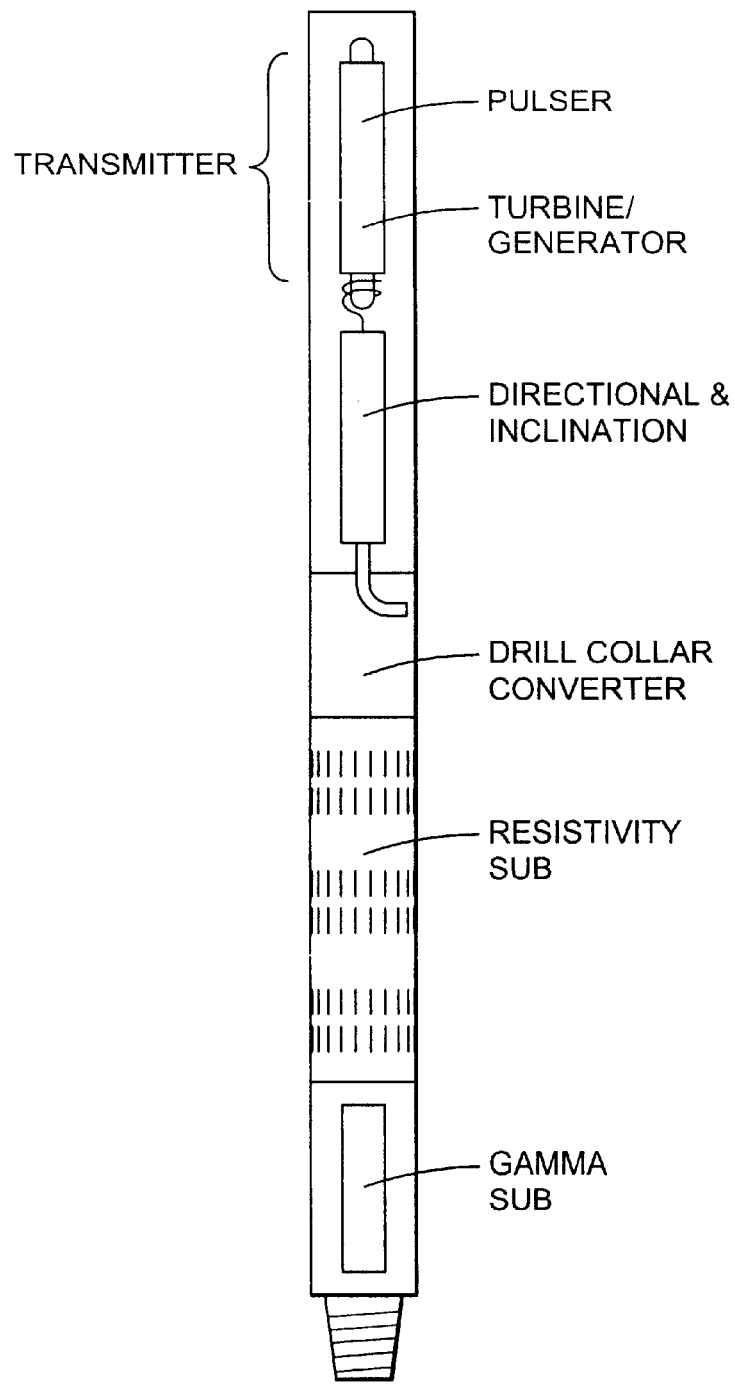
FIG. 1 is a schematic of an MWD downhole tool with separate collar sections for each sensor type.
Figure 2:
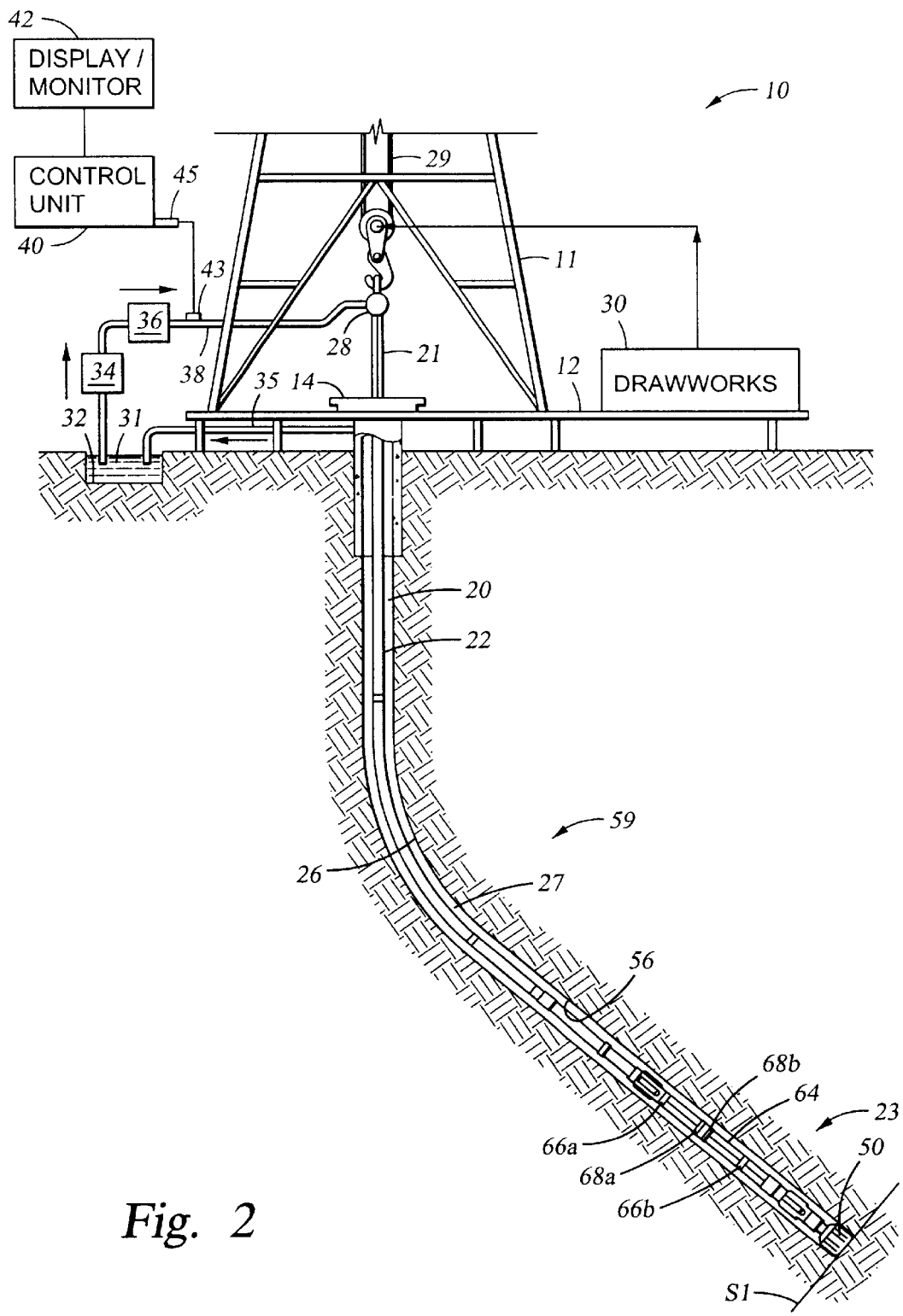
FIG. 2 is a schematic of a drilling system according to one embodiment of the present invention; and, FIG. 3 is a schematic of an integrated, single collar MWD tool with all sensors in a single collar section according to one embodiment of the present invention.

FIG. 2 shows a schematic diagram of a drilling system 10 having a downhole assembly containing a downhole sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formation 23 when it is rotated. The drill string 20 is coupled to a drawworks 30 via a kelly joint 21, swivel 28 and line 29 through a system of pulleys (not shown). During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

In the preferred embodiment of the present invention, the downhole drilling assembly 59 (also referred to as the bottomhole assembly or "BHA") which contains the various sensors and MWD devices to provide information about the formation 23 and downhole drilling parameters, is coupled between the drill bit 50 and the drill pipe 22.

Referring to FIG. 2, the BHA 59 also contains downhole sensors and devices in addition to the above-described surface sensors to measure downhole parameters of interest. Such devices include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The above-noted devices transmit data to the downhole pulser 134, which in turn transmits the data uphole to the surface control unit 40. The present invention preferably utilizes a mud pulse telemetry technique to communicate data from downhole sensors and devices during drilling operations. A transducer 43 placed in the mud supply line 38 detects the mud pulses responsive to the data transmitted by the downhole pulser 134. Transducer 43 generates electrical signals in response to the mud pressure variations and transmits such signals via a conductor 45 to the surface control unit 40. Alternatively, other telemetry techniques such electromagnetic and acoustic techniques or any other suitable technique may be utilized for the purposes of this invention.

Figure 3:
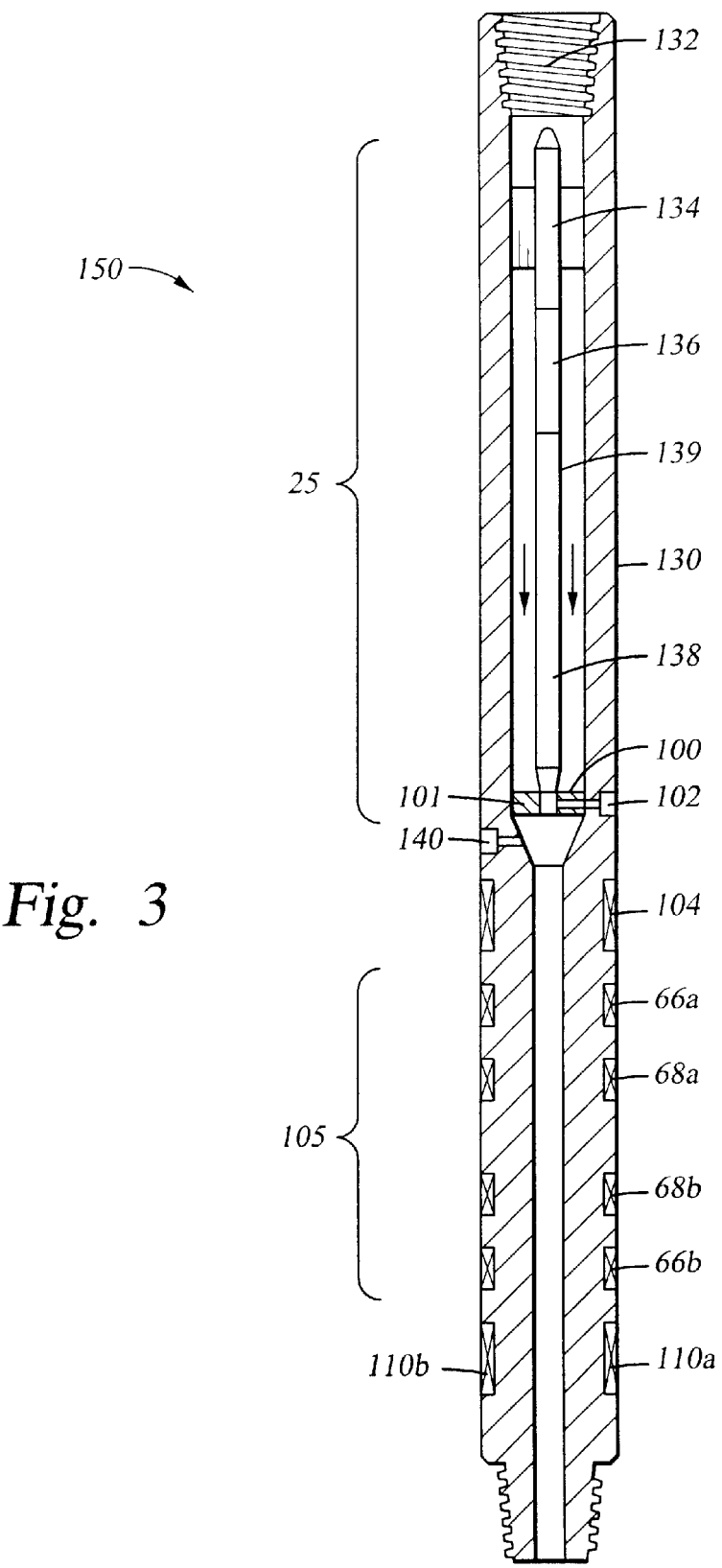

Referring to FIG. 3, an integrated MWD tool 150 is displayed comprising a sonde 25 mounted in the bore 132 of a drill collar housing 130. Collar housing 130 is no longer than a standard drill collar (approx. 31 ft.). The sonde 25 comprises a pulser 134, a turbine-generator 136, and a directional package 138, and a telemetry controller mounted (not shown) in a tubular housing 139. Sonde 25 is supported in the bore 132 by centralizer 101 which rests on an internal shoulder (not shown) of housing 130. Centralizer 101 serves to support the sonde 25 and to facilitate electrical connection between the sonde 25 and a housing controller 104. Housing controller 104 contains circuits (not shown), a processor (not shown), and memory. Housing controller 104 interfaces with pressure detection system 140, resistivity sensor 105, and gamma ray sensor 110 mounted on the external portion of housing 130. Controller 104 receives and processes signals from the collar housing 130 mounted sensors, and transmits the processed signals to a telemetry controller (not shown) in the sonde 25. The electrical connection is made by crossover connector 102, providing an environmentally protected electrical connection between telemetry controller in the sonde 25 and the housing controller 104 located on the collar housing 130.

The telemetry controller (not shown) in sonde 25 contains circuits and processors for receiving information from the housing controller 104 and the directional sensor package 138 mounted in sonde 25, and for encoding this information, according to programmed instructions, into pressure pulse data for transmission to the surface via pressure pulses generated by the pulser 134. Directional package 138 comprises sensors (not shown) and conditioning electronics located in sonde 25 for determining the azimuth and inclination of the portion of the drill string, including the collar housing 130, near the drill bit 50. Any suitable directional sensors such as accelerometers and magnetometers and/or gyro devices may be used. Such devices are known in the art and are, thus, not described in detail herein.

The formation resistivity sensor 105 and its associated electronics are mounted in recesses in collar housing 130 and provide signals from which resistivity of the formation near the drill bit 50 is determined. Resistivity sensor 105 is deployed having one or more pairs of transmitting antennas 66a,66b spaced from one or more pairs of receiving antennas 68a,68b mounted on collar housing 130 (see FIG. 3). In operation, the transmitted electromagnetic waves are perturbed as they propagate through the formation surrounding the borehole in the vicinity of the resistivity sensor 105. The receiving antennas 68a and 68b detect the perturbed waves.

Formation resistivity is derived from the phase and amplitude of the detected signals. The detected signals are processed by circuits mounted with the sensor 105 and the output is transmitted to housing controller 104 located on collar housing 130 and then transmitted to encoding circuits in the telemetry controller in sonde 25 for transmission to the surface control unit 40 via pulses generated by pulser 134.

Gamma ray sensors 110a,b and their associated electronics (not shown) are mounted in recesses in the outer surface of collar housing 130. The gamma ray sensors 110a,b measure the formation natural gamma ray emission using scintillation detectors (not shown). The scintillation detectors are arranged in separate banks on the housing 130 to provide an azimuthal indication of gamma ray emission. Alternatively, Geiger tube detectors may be used to detect formation gamma rays. Both Geiger tubes and scintillation detectors are known in the art. The signals from the gamma ray sensors are processed by the gamma ray electronics and transmitted to housing controller 104 and transmitted to encoding circuits in the telemetry controller in sonde 25 for transmission to the surface control unit 40 via pulses generated by pulser 134.

Pressure sensor module 140 is mounted in a recess in collar housing 130. The recess is adapted to provide suitable fluid porting (not shown) such that both the bore fluid pressure and the annulus fluid pressure can be determined by any suitable pressure sensors and their associated electronics. Such devices are known in the art. The signals from the pressure sensors are processed by the pressure sensor electronics (not shown) and transmitted to housing controller 104 and transmitted to encoding circuits in the telemetry controller in sonde 25 for transmission to the surface control unit 40 via pulses generated by pulser 134.

In a preferred embodiment, the pulser 134 partially restricts the drilling fluid flow, thereby generating positive pulses related to the encoded data. The pulses travel to the surface and are detected by transducer 43 and decoded by processor 40 for use by the operator. Alternatively, a negative pulser can be used to transmit data pulses to the surface. Both positive and negative pulsers are known in the art and are not discussed here further. In addition, the sonde 25 contains circuits (not shown) to condition electrical power from the turbine-generator 136 and to appropriately distribute the power to the various downhole circuits and sensors. The turbine-generator 136 intercepts at least a portion of the flow with rotating turbine blades (not shown) thereby turning a generator for producing electrical power sufficient to power the downhole sensors and electronics. Turbine-generators are known in the art.

This invention provides an MWD tool having directional sensors, formation evaluation sensors, and pressure sensors in a combined sonde/collar housing configuration that is no longer than a standard drill collar and requires no electrical connections to be made across threaded collar joints, a major advantage over prior art tools. In addition, the tool can be made up as a complete assembly in a controlled shop environment and transported to the rig as a finished assembly, obviating the need for unreliable rig assembly.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An integrated, single collar measurement-while-drilling tool for determining a plurality of downhole parameters of interest, comprising;
   a collar housing having a length no longer than a standard drill collar, said collar housing adapted to be inserted in a downhole drilling assembly;
   a plurality of sensors operatively coupled to the collar housing, said sensors adapted to determine said downhole parameters of interest;
   a telemetry device disposed in said collar housing for transmitting information related to said downhole parameters of interest to a surface processor; and,
   a downhole power source disposed in said collar housing for powering said sensors and said telemetry device.

2. The tool of claim 1, wherein the plurality of sensors comprises sensors for determining at least (a) a formation resistivity; (b) a formation gamma ray emission; (c) a drilling fluid pressure in a bore of said housing; (d) a drilling fluid pressure in an annulus between said housing and a formation; and, (e) an inclination and an azimuth of the housing.

3. The tool of claim 2, wherein the telemetry device is a positive mud pulse device.

4. The tool of claim 2, wherein the telemetry device is a negative mud pulse device.

5. The tool of claim 3, wherein the power source is a downhole turbine-generator.

6. An integrated, single collar measurement-while-drilling tool for determining a plurality of downhole parameters of interest, comprising;
   a collar housing, said collar housing adapted to be inserted in a downhole drilling assembly, said collar housing being no longer than a standard drill collar, said collar housing having an axial bore for allowing a flow of drilling fluid therethrough, said bore adapted to receive a sonde;
   a housing processor and a plurality of housing located sensors disposed on said collar housing, said plurality of housing located sensors adapted to provide formation resistivity information, formation gamma ray emission information, bore pressure information, and annulus pressure information to the housing processor, said housing processor adapted to transmit, under programmed instructions said information from said plurality of housing located sensors to a telemetry processor;
   the sonde, said sonde adapted to mount in said housing bore, said sonde comprising;
      the telemetry processor and a directional package, said directional package providing directional information to said telemetry processor, said telemetry processor adapted to receive said housing mounted sensor information from said housing processor, said telemetry processor further adapted to act cooperatively with a telemetry device to transmit said housing located sensor information and said directional information to a surface processor;
      a power generation device for generating electrical power for driving said telemetry device and said sensors; and,
      a crossover connector, said crossover connector adapted to make at least one electrical connection between said housing processor and said telemetry processor.

* * * * *